(12) United States Patent
Yano

(10) Patent No.: US 9,245,351 B2
(45) Date of Patent: Jan. 26, 2016

(54) COLOR EVALUATION APPARATUS, COLOR EVALUATION METHOD AND COMPUTER PROGRAM

(71) Applicant: Naomi Yano, Tokyo (JP)

(72) Inventor: Naomi Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/388,129

(22) PCT Filed: Nov. 29, 2012

(86) PCT No.: PCT/JP2012/080982
§ 371 (c)(1),
(2) Date: Sep. 25, 2014

(87) PCT Pub. No.: WO2013/145445
PCT Pub. Date: Oct. 3, 2013

(65) Prior Publication Data
US 2015/0043812 A1 Feb. 12, 2015

(30) Foreign Application Priority Data

Mar. 29, 2012 (JP) ................................. 2012-077563

(51) Int. Cl.
*G06K 9/00* (2006.01)
*G06T 7/40* (2006.01)
(Continued)

(52) U.S. Cl.
CPC .............. *G06T 7/408* (2013.01); *G06K 9/4652* (2013.01); *G06T 7/0081* (2013.01); *G06T 2207/10004* (2013.01); *G06T 2207/10024* (2013.01)

(58) Field of Classification Search
CPC .... G06K 9/4652; G06T 7/0081; G06T 7/408; G06T 2207/10024

USPC .......................................................... 382/164
See application file for complete search history.

(56) References Cited

U.S. PATENT DOCUMENTS

2005/0129316 A1* 6/2005 Curti et al. .................... 382/224
2005/0223363 A1* 10/2005 Black-Ziegelbein et al. . 717/127
(Continued)

FOREIGN PATENT DOCUMENTS

| JP | 2002-197403 A | 7/2002 |
|----|---------------|--------|
| JP | 2003-271779 A | 9/2003 |

(Continued)

OTHER PUBLICATIONS

International Search Report corresponding to PCT/JP2012/080982, dated Feb. 5, 2013 (5 pages).

(Continued)

*Primary Examiner* — Ali Bayat
(74) *Attorney, Agent, or Firm* — Wilmer Cutler Pickering Hale and Dorr LLP

(57) ABSTRACT

Provided are a color evaluation apparatus and the like capable of evaluating the appropriateness of a color scheme in an image to be evaluated. A color evaluation apparatus 101 includes a division unit 102 that identifies a partial region of an input image, an acquisition unit 103 that acquires color information for identifying a color contained in the partial region and a first character string contained in the partial region, an extraction unit 104 that extracts a second character string which is associated in advance with the color information, and an evaluation unit 105 that evaluates appropriateness of the color information according to a result of comparing the first character string and the second character string.

8 Claims, 16 Drawing Sheets

(51) Int. Cl.
*G06K 9/46* (2006.01)
*G06T 7/00* (2006.01)

(56) References Cited

U.S. PATENT DOCUMENTS

2010/0192173 A1* 7/2010 Mizuki et al. .................. 725/25
2010/0293447 A1* 11/2010 Kadowaki et al. ............ 715/201

FOREIGN PATENT DOCUMENTS

| JP | 2006-058950 A | 3/2006 |
| JP | 2007-257409 A | 10/2007 |
| JP | 2008-171299 A | 7/2008 |
| JP | 2010-267019 A | 11/2010 |

OTHER PUBLICATIONS

Raymond, Scott, "Ajax on Rails," 1st edition, O'Reilly Japan, Inc., Jul. 19, 2007, pp. 94-99.

Yukiko Tanigawa, "Proposal of Method for Evaluating and Recommending Colors from Usability Viewpoint," FIT2011 Dai 10 Kai Forum on Information Technology Koen Ronbunshu, separate vol. 3, Aug. 22, 2011, pp. 523-524.

Yumi Yano, "Applying Method for Evaluating and Recommending Colors to an Actual Application for Usability Evaluation," FIT2011 Dai 10 Kai Forum on Information Technology Koen Ronbunshu, separate vol. 3, Aug. 22, 2011, pp. 525-526.

* cited by examiner

Fig. 3

| REGION IDENTIFIER | POSITIONAL COORDINATES | HEIGHT | WIDTH | COLOR OF REGION | MEANING OF DISPLAY INFORMATION |
|---|---|---|---|---|---|
| 1 | 200,400 | 200 | 1000 | FF0000 | PROHIBITED |
| 2 | 200,800 | 200 | 1000 | EE82EE | DANGER |

Fig. 4

| REGION IDENTIFIER | POSITIONAL COORDINATES | HEIGHT | WIDTH | COLOR OF REGION | MEANING OF DISPLAY INFORMATION | COLOR IMAGE |
|---|---|---|---|---|---|---|
| 1 | 200,400 | 200 | 1000 | FF0000 | PROHIBITED | INFORMATION, PROHIBITED, AGGRESSIVE, REVOLUTION... |
| 2 | 200,800 | 200 | 1000 | EE82EE | DANGER | NOBLE, ELEGANT, DELICATE... |

Fig. 7

| | COLOR NAME | HEXADECIMAL INDICATION | HLS VALUE | ... | COLOR IMAGE |
|---|---|---|---|---|---|
| JAPAN | RED | #FF0000 | | ... | INFORMATION, PROHIBITED, AGGRESSIVE, REVOLUTION... |
| | YELLOW | #FFD400 | | ... | PEACE, LUCID, DANGER, ACTIVE... |
| | ... | ... | ... | ... | ... |

| | COLOR NAME | HEXADECIMAL INDICATION | HLS VALUE | ... | COLOR IMAGE |
|---|---|---|---|---|---|
| CHINA | RED | #FF0000 | | ... | PROHIBITED, WEDDING, BRIDAL COSTUME... |
| | YELLOW | #FFD400 | | ... | PEMPEROR, LUST... |
| | ... | ... | ... | ... | ... |

| REGION IDENTIFIER | POSITIONAL COORDINATES | HEIGHT | WIDTH | COLOR OF REGION | MEANING OF DISPLAY INFORMATION | COLOR IMAGE | SEMANTIC SIMILARITY |
|---|---|---|---|---|---|---|---|
| 1 | 200,400 | 200 | 1000 | FF0000 | PROHIBITED | INFORMATION, PROHIBITED, AGGRESSIVE, REVOLUTION... | 1.00 |
| 2 | 200,800 | 200 | 1000 | EE82EE | DANGER | NOBLE, ELEGANT, DELICATE... | 0.12 |

COLOR EVALUATION APPARATUS, COLOR EVALUATION METHOD AND COMPUTER PROGRAM

CROSS-REFERENCE TO RELATED APPLICATIONS

This application is a national stage application of International Application No. PCT/JP2012/080982 entitled "Color Evaluation Apparatus, Color Evaluation Method and Computer Program," filed on Nov. 29, 2012, which claims the benefit of the priority of Japanese patent application No. 2012-077563, filed on Mar. 29, 2012, the disclosures of each of which are hereby incorporated by reference in their entirety.

BACKGROUND

The present invention relates to the technical field of information processing for evaluating the appropriateness of colors.

In order to determine the color scheme of a screen to improve usability, in addition to simply combining the colors, it is also necessary to give consideration to the meaning represented by the information that exists in the region to which a color is to be assigned. Nevertheless, the related technologies described in the related technical documents and the like simply evaluate the appropriateness of the color scheme only based on the area of the region or the relationship of the colors.

The color evaluation apparatus disclosed in Patent Document 1 extracts information of color and images as hierarchy/color scheme information according to Web contents. Subsequently, this color evaluation apparatus calculates the index values (brightness, color phase, saturation) pertaining to readability from the foregoing information of colors and images. Finally, this color evaluation apparatus uses the foregoing index values and evaluates, in multiple stages and in a comprehensive manner, the readability based on the extracted information. This color evaluation apparatus thereby inspects the readability of the text color and background color, and further presents the recommended colors.

The technology disclosed in Patent Document 2 assigns the base color and the accent color according to the area of the object configuring the document or the occupancy in the overall document. This technology performs a color scheme of assigning the accent color to the object with the smallest area and assigning the base color to the object with the largest area, respectively.

The technology disclosed in Patent Document 3 analyzes the input contents and obtains the characteristic data thereof. Subsequently, this technology checks the association of the obtained characteristic data and the input index data, and performs weighting of the respective index data according to the association. This technology thereafter associates the contents and the plurality of index data that were subject to weighting processing, and registers the association in a database.

Patent Document 1: Patent Publication JP-A-2002-197403
Patent Document 2: Patent Publication JP-A-2006-058950
Patent Document 3: Patent Publication JP-A-2008-171299

In order to determine the color scheme of a screen to improve usability, in addition to simply combining the colors, it is also necessary to give consideration to the meaning represented by the information that exists in the region to which a color is to be assigned. Thus, it is difficult for a person with no expertise in color schemes and usability to perform a color scheme that gives consideration to meanings or present improvement plans of a color scheme.

SUMMARY

Hence, the primary object of the present invention is to provide a color evaluation apparatus and the like capable of evaluating the appropriateness of a color scheme in an image to be evaluated.

The color evaluation apparatus according to the present invention is characterized in comprising the following configuration.

In other words, the color evaluation apparatus according to the present invention includes:
  a partial image identification means for identifying a partial region of an input image;
  an information acquisition means for acquiring color information for identifying a color contained in the partial region and a first character string contained in the partial region;
  a first extraction means for extracting a second character string which is associated in advance with the color information; and
  an evaluation means for evaluating appropriateness of the color information according to a result of comparing the first character string and the second character string.

Moreover, as another aspect of the present invention, the color evaluation method according to the present invention includes:
  identifying a partial region of an input image;
  acquiring color information for identifying a color contained in the partial region and a first character string contained in the partial region;
  extracting a second character string which is associated in advance with the color information; and
  evaluating appropriateness of the color information according to a result of comparing the first character string and the second character string.

Moreover, the foregoing object can also be achieved with a computer program that realizes the color evaluation apparatus configured as described above and the corresponding method thereof using a computer, and with a computer-readable storage medium storing the foregoing computer program.

According to the present invention, it is possible to evaluate the appropriateness of a color scheme in an image to be evaluated.

DESCRIPTION OF DRAWINGS

FIG. 3 is a diagram showing an example of the region information table in the first embodiment.

FIG. 4 is a diagram showing an example of the specification information table in the first embodiment.

FIG. 7 is a diagram showing an example of the information retained in the color database in the second embodiment.

FIG. 10 is a diagram showing an example of the semantic similarity table in the third embodiment.

DETAILED DESCRIPTION

Embodiments of the present invention are now explained in detail with reference to the drawings.

First Embodiment

Figure 1:
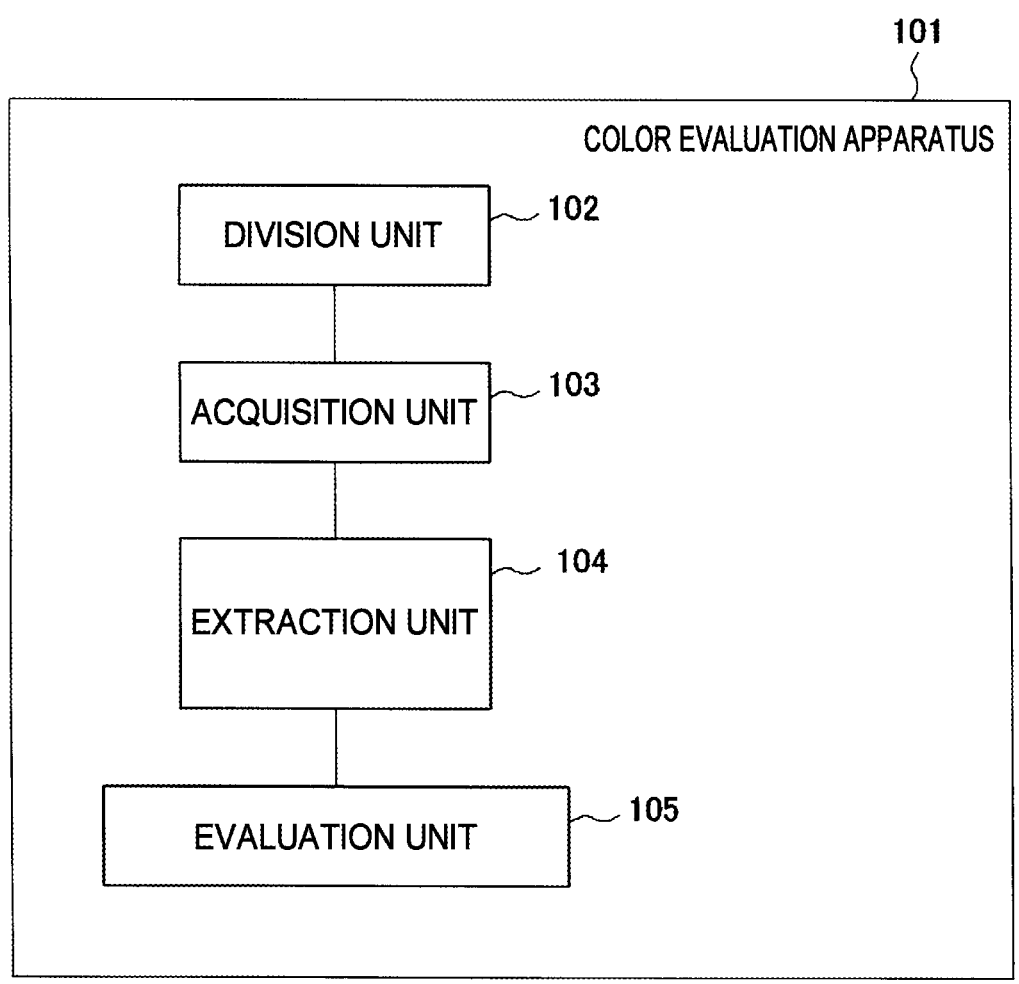
FIG. 1 is a block diagram showing a configuration of the color evaluation apparatus according to the first embodiment.

FIG. 1 is a block diagram showing a configuration of the color evaluation apparatus according to the first embodiment.

Referring to FIG. 1, the color evaluation apparatus 101 according to the first embodiment comprises a division unit 102 as a partial image identification unit that identifies a partial region of an input image, an acquisition unit 103 as an information acquisition unit that acquires color information for identifying a color contained in the partial region and a character string contained in the partial region, an extraction unit 104 as an extraction unit that extracts a character string which is associated in advance with the color information, and an evaluation unit 105 that evaluates appropriateness of the color information.

The color evaluation apparatus 101 receives evaluation target screen information as an input. The evaluation target screen information is information for generating image information (image data) that configures an image to be displayed on a display device (not shown in FIG. 1). The evaluation target screen information is expressed, for example, in a language such as a Hyper Text Markup Language (hereinafter abbreviated as "HTML"), and image data in bitmap format or the like. In the ensuing explanation, while the evaluation target screen information is explained using terms such as HTML and bitmap, the color evaluation apparatus 101 will operate similarly even when the evaluation target screen information is expressed in other languages or formats.

Figure 2:
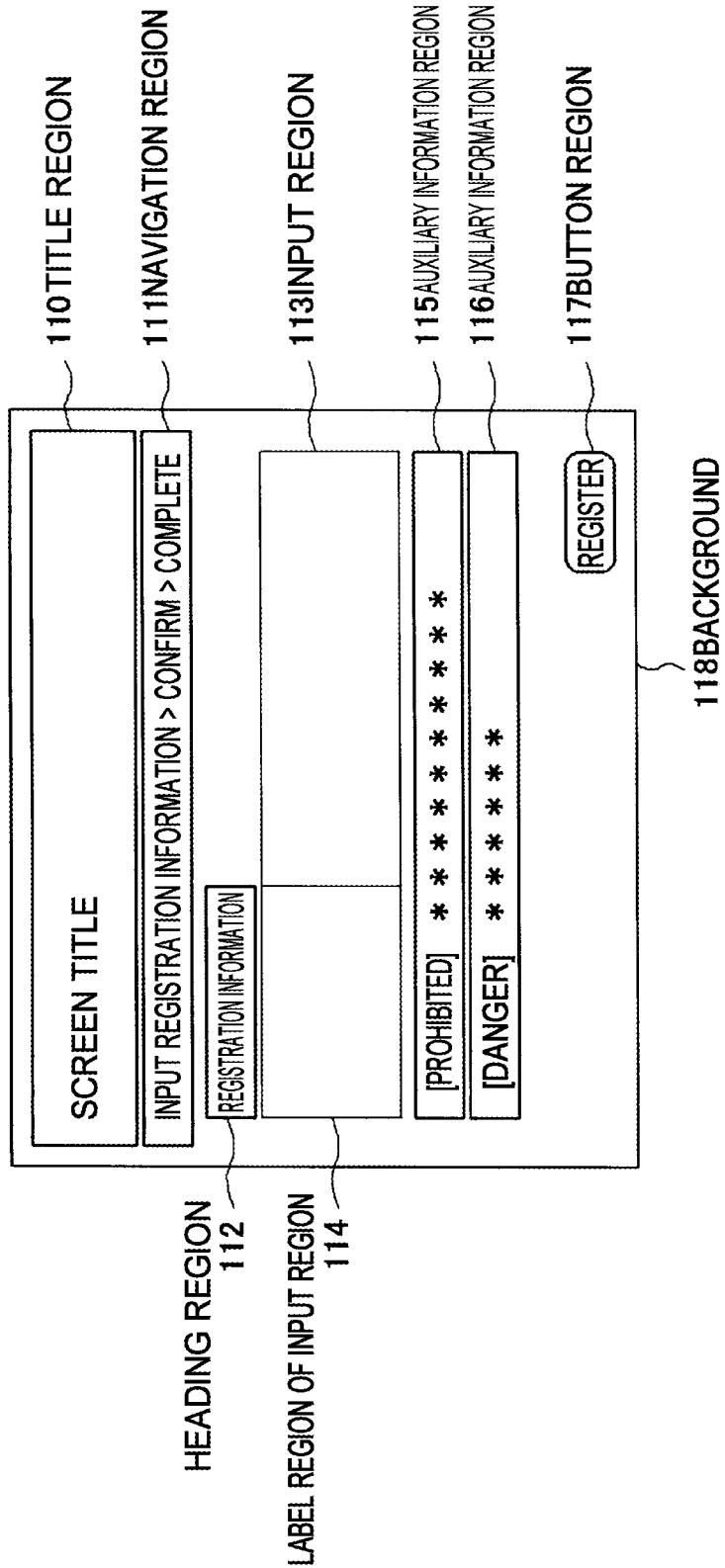
FIG. 2 is a diagram showing an example of the screen to be evaluated in the first embodiment.

The division unit 102 divides the image information (image data) that configures an image to be displayed on a display device (hereinafter sometimes abbreviated as a "screen") into at least one or more small regions. For example, when the screen is described using HTML, one small region may be a portion corresponding to a description surrounded by a certain start tag and a corresponding end tag. In the ensuing explanation, the portion of the description surrounded by a certain start tag and a corresponding end tag is referred to as a "tag scope". The division unit 102 divides the image into respective small regions as described above based on the tag scope. When the evaluation target screen information is described using image data, the division unit 102 uses existing image processing technology or the like to divide the image data into small regions having the same type of information. For example, when the evaluation target screen information, which will cause the image to be displayed as the screen shown in FIG. 2, is input, the division unit 102 divides the screen into small regions as follows. In other words, the division unit 102 divides the screen into the following nine small regions; specifically, a title region 110, a navigation region 111, a heading region 112, an input region 113, a label region 114 of the input region, an auxiliary information region 115, an auxiliary information region 116, a button region 117, and a background 118.

In the ensuing explanation, the term "components" refers to the small regions that were divided through analysis of the tag scope or image processing technology or the like. Moreover, the term "screen configuration" refers to the state in which the components existing on the screen are combined. Moreover, the screen configuration can be checked through analysis of the tag scope or image processing technology as described above. Note that the term "divide" also includes cases where there is only one component.

The acquisition unit 103 acquires the colors existing in the respective small regions that were created by the division unit 102, and character strings that represent the meaning of the information. These character strings represent the meaning, for each small region, to be conveyed to the user who used the display device and viewed the screen.

FIG. 2 is a diagram showing an example of the screen to be evaluated in the first embodiment. FIG. 2 is a diagram showing an example of the screen to be evaluated not only in the first embodiment, but also in the second to fifth embodiments. This screen contains information, through color-coding according to the respective regions, such as a title region 110 showing the title of the screen, a navigation region 111 displaying the current position or explanation regarding the operations to be performed on that screen, a heading region 112 indicating the heading, an input region 113 for inputting information and the like, and a label region 114 of the input region indicating the label of that input region. For example, the heading region 112 is colored blue. The auxiliary information region 115 is colored red. Moreover, the auxiliary information region 116 is colored purple. In other words, the respective regions are classified by color. This screen may also include regions other than those described above.

In the screen to be evaluated shown in FIG. 2, the auxiliary information region 115 is a region displaying a sentence for conveying "Prohibited" using a character string. In other words, the auxiliary information region 115 is a region for displaying information which means "Prohibited". Information that is associated with a region is not only information existing in that region, and also includes information such as the auxiliary information region and the label region related thereto.

FIG. 3 is a diagram showing an example of the region information table in the first embodiment. FIG. 3 is a diagram showing an example of the region information table not only in the first embodiment, but also in the second to fifth embodiments. The region information table T2 stores information related to the respective small regions existing in the image by associating the information with an identifier for identifying the small regions, the positional coordinates thereof, the height thereof, the width thereof, descriptions indicating the color thereof (hereinafter abbreviated as "color information"; wherewith a reference numeral is additionally added and this is indicated as "color information I3"), character strings representing the meaning of the display information associated therewith, and so on.

The operations of the division unit 102 and the acquisition unit 103 are now explained with reference to FIG. 2 and FIG. 3. In the ensuing explanation, let it be assumed that the evaluation target screen information I1 is described using HTML. However, since the division unit 102 and the acquisition unit 103 will operate similarly even when a language other than HTML is used or when the evaluation target screen information I1 is described using an image, the explanation thereof is omitted.

The division unit 102 divides the screen into at least one or more small regions. For example, when the screen is described using HTML, the division unit 102 analyzes the tag scope, and divides the screen into small regions as described above.

The acquisition unit 103 acquires the color information I3 of each of the small regions. The acquisition unit 103 refers to Cascading Style Sheets (hereinafter sometimes abbreviated as "CSS") and the like and acquires attributes of the small regions such as the color information I3, the positional coordinates, the height, and the width of the small regions. Note that, when the acquisition unit 103 determines that the color within the small region is not uniform, the acquisition unit 103 may acquire the median or the like as the color of that small region.

Subsequently, the acquisition unit 103 acquires the character strings in the respective small regions that were divided by the division unit 102. The method of acquiring the character strings may be via an Optical Character Reader (hereinafter sometimes abbreviated as "OCR"), or reading as character strings. The acquisition unit 103 thereafter associates the acquired character string and the attributes of the small region such as the color information I3, the positional coordinates, the height, and the width acquired by the acquisition unit 103 with regard to one small region to be evaluated, and adds the association in the region information table T2 as a line of the region information table T2.

The acquisition unit 103 may perform the foregoing processing to all of the small regions that were created by the division unit 102. Moreover, the acquisition unit 103 may perform the foregoing processing to the small regions from which character strings can be acquired. The acquisition unit 103 thereby creates lines in the region information table T2 for the small regions that were divided by the division unit 102.

Subsequently, the extraction unit 104 extracts the color information from the region information table T2 with regard to each of the small regions. The extraction unit 104 thereafter extracts the character string representing the color image which was associated in advance with the extracted color information. Here, the character string representing the color image may be stored in a table (not shown) which associates the color information and the character string representing the color image regarding that color information, or in a database (not shown) that stores at least one or more types of the foregoing table. The extraction unit 104 can extract the character string representing the color image which was associated in advance with the extracted color information by referring to the foregoing table or database. The character string to be extracted may be a plurality of character strings. In other words, the extraction unit 104 searches for data having the same color information as the information extracted as described above from the table, and reads the character strings associated with that data. Subsequently, the extraction unit 104 associates the relevant line of the region information table T2 and the extracted character string with regard to each of the small regions, and creates a line of the specification information table T3 with the foregoing line and character string as a pair (FIG. 4). Here, FIG. 4 is a diagram showing an example of the specification information table in the first embodiment. In the example of FIG. 4, the extraction unit 104 is associating the extracted character string as a color image with the line of the region information table T2, and thereby creating a line of the specification information table T3. FIG. 4 is a diagram showing an example of the specification information table not only in the first embodiment, but also in the second to fifth embodiments.

Subsequently, the evaluation unit 105 extracts one line from the specification information table T3. The respective lines in the table represent that they are mutually associated. This also applies to the explanation of the other portions regardless of the type of table. The evaluation unit 105 compares the character string representing the meaning of the display information and the character string associated with the color image with regard to the one line that was extracted. When there are a plurality of character strings that are associated as a color image, the character strings included therein and the character string representing the meaning of the display information are compared. To extract a character string from the character string or character string group associated with the color is expressed as "associated with the color".

Consequently, when there is a character string that coincides with the character string representing the meaning of the small region in the character string (hereinafter including cases of containing a plurality of character strings) associated with that color image, the evaluation unit 105 evaluates "No problem with color scheme" for the color of that small region. Meanwhile, when there is no character string that coincides with the character string representing the meaning of the small region in the character string associated with that color image, the evaluation unit 105 evaluates "Problem with color scheme" for the color of that small region. The evaluation unit 105 may also perform the foregoing processing to all lines of the specification information table T3.

Figure 5:
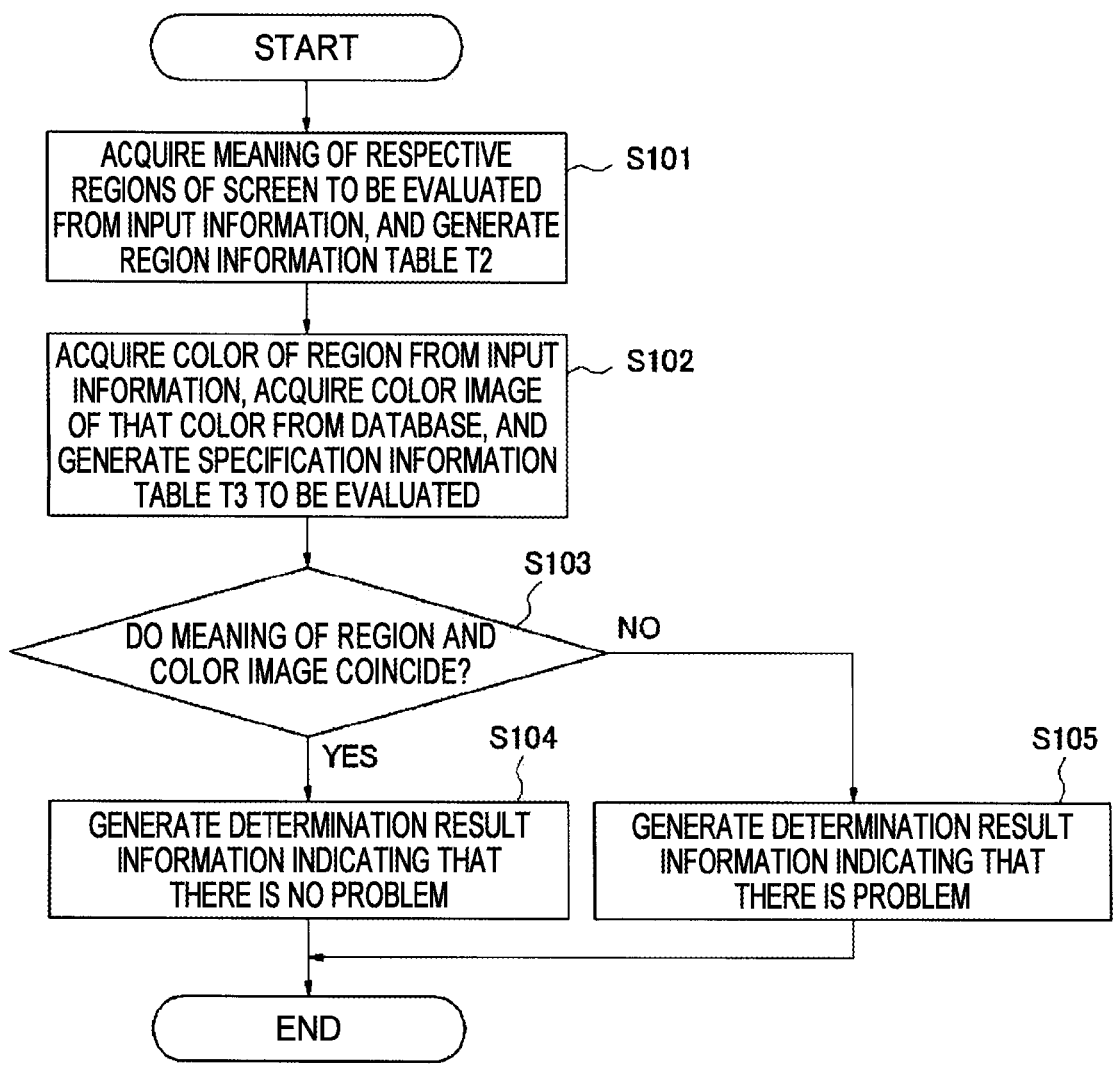
FIG. 5 is a flowchart related to the processing to be performed by the color evaluation apparatus according to the first embodiment.

FIG. 5 is a flowchart related to the processing to be performed by the color evaluation apparatus according to the first embodiment. The operation of the color evaluation apparatus according to the first embodiment is now explained with reference to the flowchart of FIG. 5.

The division unit 102 divides screen data to be evaluated into small regions. The acquisition unit 103 extracts the color and the character string of each of the small regions, associates the extracted information, and registers the association in the region information table T2 (step S101). The extraction unit 104 refers to an external table or database, and creates the specification information table T3 (step S102). The extraction unit 104 thereafter sends the specification information table T3 and the character strings assigned to the small regions to the evaluation unit 105.

The evaluation unit 105 checks whether the character string assigned to the small region and the character string associated as the color image related to the color assigned to that small region coincide in the received specification information table T3 (step S103). When a coinciding character string is consequently included, the evaluation unit 105 evaluates "No problem with color scheme" (step S104), and, when a coinciding character string is not included, the evaluation unit 105 evaluates "Problem with color scheme" (step S105).

The color evaluation apparatus according to the first embodiment evaluates the appropriateness of the color scheme and the meaning contained in the small region thereof by checking whether the character string representing the color image of the color assigned to each of the small regions of the screen to be evaluated, and the character string representing the information of the small region coincide.

In other words, according to the color evaluation apparatus of the first embodiment, it is possible to evaluate the appropriateness of the color scheme of the region in the image to be evaluated and the meaning included in that region.

Note that the foregoing explanation described a case where there is one evaluation criterion regional name I2 which indicates the name of the region to be used as the basis of evaluation. Nevertheless, one evaluation criterion regional name does not necessarily have to be used. The color evaluation apparatus 101 may also be configured to receive the evaluation criterion regional name as an input. In the foregoing case, the acquisition unit 103 may perform the foregoing processing as represented with step S102 while searching for a table associated with the evaluation criterion regional name from an external table or database, and referring to that table. In the foregoing case, the external table or database may also store a table that associates the color information and the character string representing the color image regarding that color information for each evaluation criterion regional name. According to this configuration, the color evaluation apparatus 101 can regionally evaluate the color scheme.

Second Embodiment

The second embodiment, which is based on the foregoing first embodiment, is now explained. In the ensuing explanation, the characteristic portions according to this embodiment are mainly explained, and the same configuration as the foregoing first embodiment is given the same reference numeral, and the redundant explanation thereof is omitted.

Figure 6:
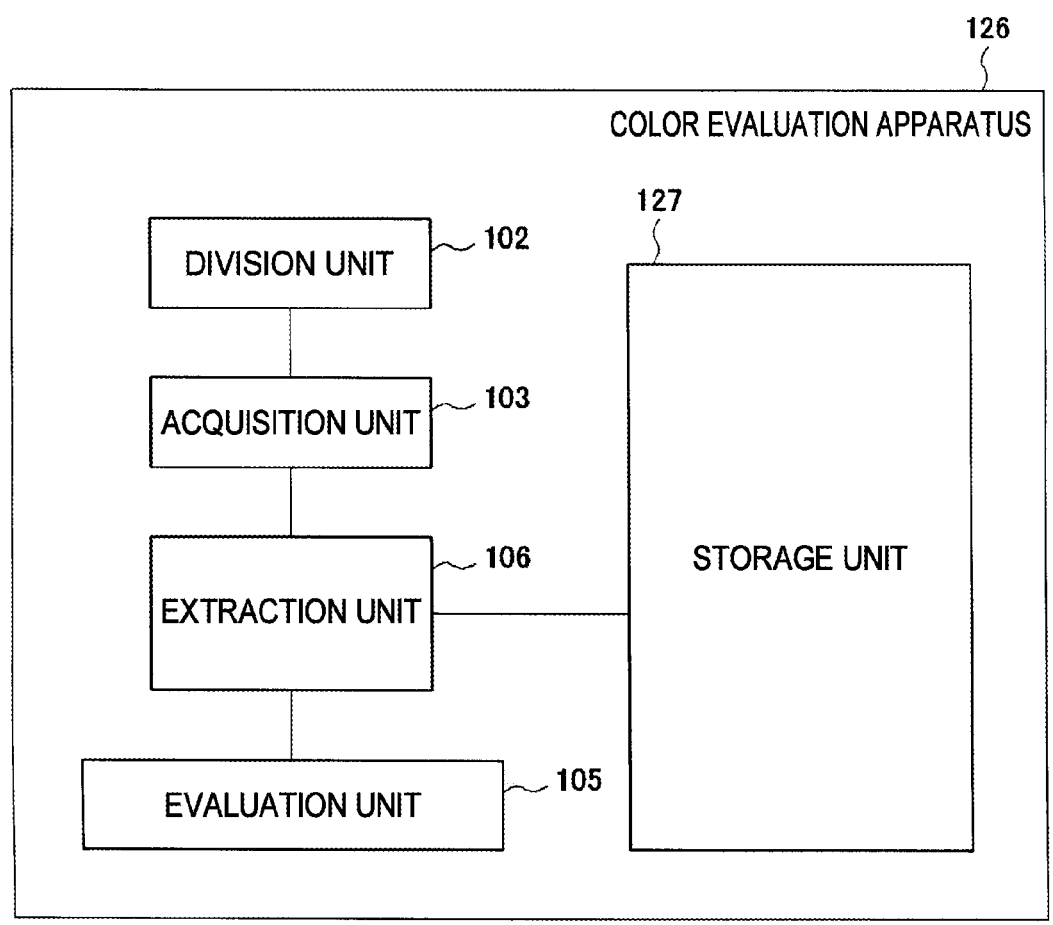
FIG. 6 is a block diagram showing a configuration of the color evaluation apparatus according to the second embodiment.

FIG. 6 is a block diagram showing a configuration of the color evaluation apparatus according to the second embodiment.

Referring to FIG. 6, the color evaluation apparatus according to the second embodiment further comprises an extraction unit 106 and a storage unit 127, in substitute for the extraction unit 104, in addition to the configuration of the color evaluation apparatus according to the first embodiment.

The storage unit 127 stores a color image database 107. The color image database 107 stores at least one or more color image tables T1 (hereinafter sometimes abbreviated simply as "color image tables") that associate the color information and the character string representing the image (color image) that is sensed when a person views the color represented by that color information. The color image table is structured as described below.

FIG. 7 is a diagram showing an example of the information retained in the color image database 107 in the second embodiment. FIG. 7 is a diagram showing an example of the information stored in the color image database 107 not only in the second embodiment, but also in the third to fifth embodiments explained below. The color image database 107 stores at least one or more color image tables. The color image table may be associated with an evaluation criterion regional name. In this example, the color image database 107 stores a color image table 108 associated with Japan, and a color image table 109 associated with China. The ensuing explanation is made with reference to the color image table 108. The ensuing explanation is not limited to the color image table 108, and other color image tables may also be used.

The color image table 108 associates the color name, the hexadecimal indication corresponding to that color (hereinafter abbreviated as "hexadecimal indication"), the Hue Lightness Saturation value (hereinafter abbreviated as the "HLS value"), words expressing the color image, and the like. The words expressing the color image may also be character strings. The color image table 108 may also be associated with values other than those indicated above, and does not have to be necessarily associated with all of the items illustrated above. For example, numerical values that represent colors include various representations such as the Red, Green, Blue (hereinafter abbreviated as "RGB") value, the HLS value, and the hexadecimal indication, the color image table 108 may include these representations.

The color image table 108 stores representations according to at least one or more types of representation methods so that it is possible to accommodate the input color to be evaluated regardless of the representation thereof. The character string representing the color image existing in the color image table 108 represents the image that is sensed by many people when they view the colors, and integrates such colors.

For example, the color of #FF0000 based on the hexadecimal indication (that is, red) means "passion, prohibited, aggressive, revolution . . . " in and around Japan, and means "prohibited, wedding, bridal costume . . . " in and around China. Since the color image differs depending on the region, the color image database 107 may store at least one or more types of color image tables 108 associated with an evaluation criterion regional name.

The extraction unit 106 extracts the color information from the region information table T2 with regard to each of the small regions, and compares the extracted color information and the color information stored in the color image table 108 in the storage unit 127. The extraction unit 106 thereafter extracts the character string representing the color image associated with the color information of the small regions from the color image table 108. Subsequently, the extraction unit 106 associates the relevant line of the region information table T2 and the extracted character string with regard to each of the small regions, and registers the foregoing line and character string as a pair in the specification information table T3 (FIG. 4).

The foregoing explanation described a case where there is one evaluation criterion regional name, but one evaluation criterion regional name does not necessarily have to be used. When the color evaluation apparatus 126 receives an evaluation criterion regional name, the acquisition unit 103 performs the processing described above after extracting the color image table 108 associated with that regional name from the storage unit 127.

The flowchart of the processing according to the second embodiment that is based on the foregoing first embodiment is now explained. In the ensuing explanation, step S602 of FIG. 8 in this embodiment is mainly explained. The flowchart of the processing that is the same as the foregoing first embodiment is given the same reference numeral and the redundant explanation thereof is omitted.

Figure 8:
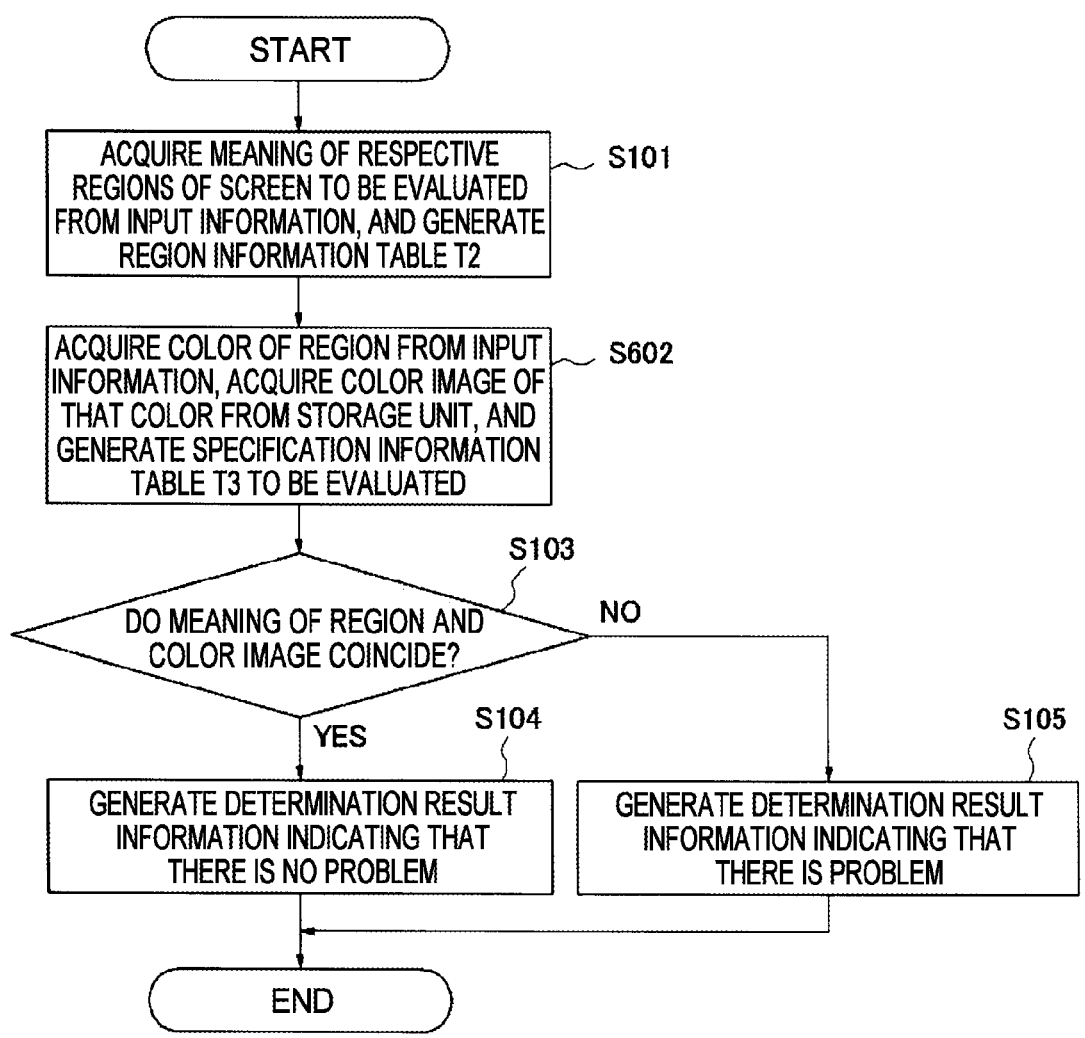
FIG. 8 is a flowchart related to the processing to be performed by the color evaluation apparatus according to the second embodiment.

FIG. 8 is a flowchart related to the processing to be performed by the color evaluation apparatus according to the second embodiment. The operation of the color evaluation apparatus according to the second embodiment is now explained with reference to the flowchart of FIG. 8.

The extraction unit 106 searches for the color image table 108 associated with the received evaluation criterion regional name from the storage unit 127, and thereby creates the specification information table T3 as described above (step S602). Subsequently, the extraction unit 106 sends the specification information table T3 and the character string representing the information of the small regions to the evaluation unit 105.

The color evaluation apparatus according to the second embodiment evaluates the appropriateness of the color scheme and the meaning contained in the small region thereof by checking whether the character string representing the color image associated with the color assigned to each of the small regions of the screen to be evaluated, and the character string representing the information of the small region coincide.

In other words, according to the color evaluation apparatus of the second embodiment, it is possible to evaluate the appropriateness of the color scheme of the region in the image to be evaluated and the meaning included in that region. Furthermore, according to the color evaluation apparatus of the second embodiment, it is possible to regionally evaluate the color scheme.

Third Embodiment

The third embodiment is now explained. In the ensuing explanation, the differences between this embodiment and the foregoing first embodiment are mainly explained. The same configuration as the foregoing first embodiment is given the same reference numeral, and the redundant explanation thereof is omitted.

Figure 9:
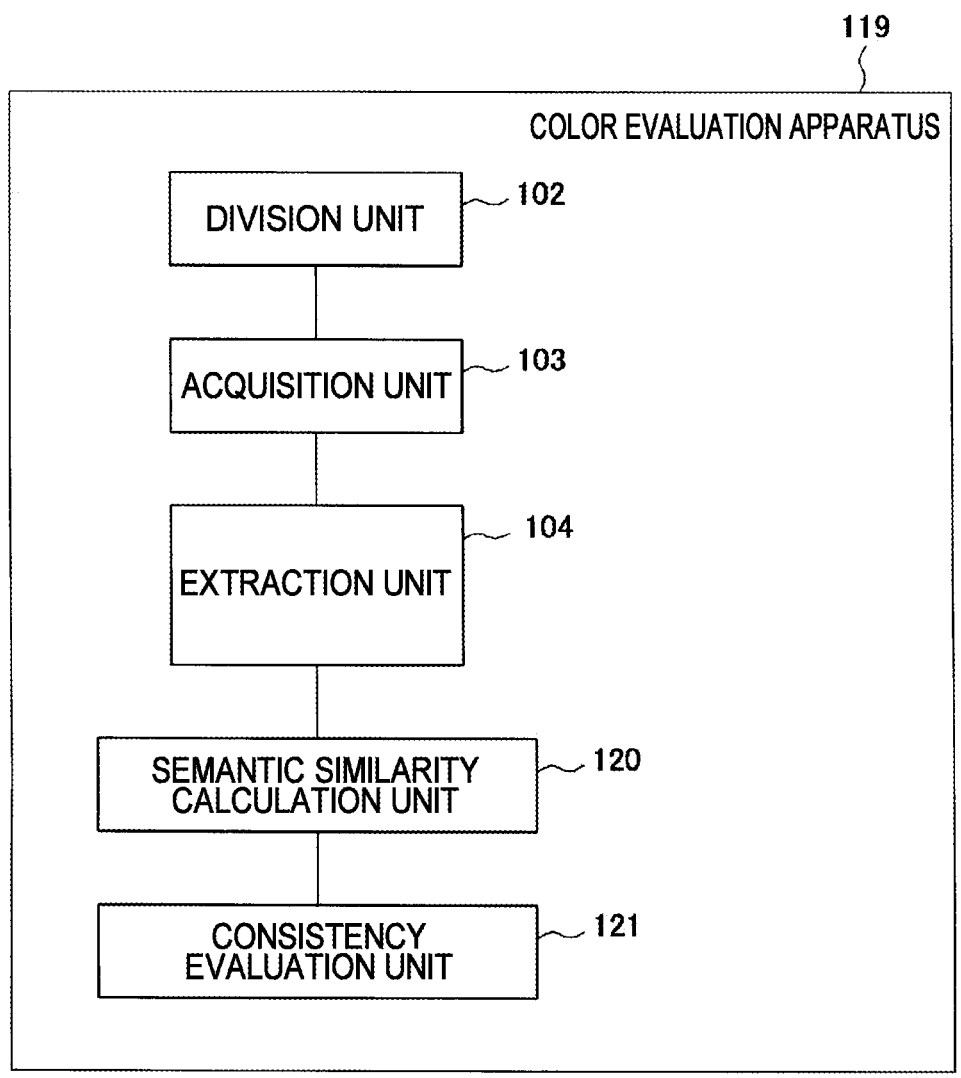
FIG. 9 is a block diagram showing a configuration of the color evaluation apparatus according to the third embodiment.

FIG. 9 is a block diagram showing a configuration of the color evaluation apparatus according to the third embodiment.

Referring to FIG. 9, the color evaluation apparatus 119 according to the third embodiment comprises a division unit 102, an acquisition unit 103, an extraction unit 104, a semantic similarity calculation unit 120, and a consistency evaluation unit 121.

FIG. 10 is a diagram showing an example of the semantic similarity table T4 in the third embodiment. The semantic similarity table T4 associates region information I4, meaning of display information of the region S2 (hereinafter indicated as the "character string representing the meaning of display information of the small region"), a character string representing the color image of the small region, and the calculated semantic similarity. Here, as the region information I4, information including the positional coordinates, height, width, and color of each of the small regions may be used. The semantic similarity table T4 is not limited to the items illustrated above.

The semantic similarity calculation unit 120 extracts one line from the specification information table T3. The semantic similarity calculation unit 120 calculates the similarity of the character string representing the meaning of the display information and the character string representing the color image in the one line that was extracted.

As one example of the calculation method of the semantic similarity, there is Latent Semantic Analysis (LSA). In LSA, the character string representing the meaning of display information of the small region and the color image character string S1 (hereinafter indicated as the "character string representing the color image") are respectively represented as vectors in a semantic space. Subsequently, in LSA, the cosine of the angle formed by these vectors is calculated, and the obtained result is used as the semantic similarity between the character string representing the meaning of display information of the small region and the character string representing the color image of the region. The value of the semantic similarity will be higher as the similarity between the character strings is higher. The calculation method of the semantic similarity in the third embodiment is not limited to LSA, and the calculation may also be performed based on other calculation methods.

The semantic similarity calculation unit 120 forms a pair by associating the one line extracted from the specification information table T3 and the result of the similarity performed above, and performs this pairing for all lines of the specification information table T3. Subsequently, the semantic similarity calculation unit 120 stores, in the semantic similarity table T4, all pairs obtained as a result of the calculation of the similarity performed for all lines in the specification information table T3.

The consistency evaluation unit 121 receives the semantic similarity table T4, and evaluates "No problem with color scheme" when the calculated similarity is greater than or equal to a predetermined threshold, and evaluates "Problem with color scheme" when the calculated similarity is less than a predetermined threshold.

Figure 11:
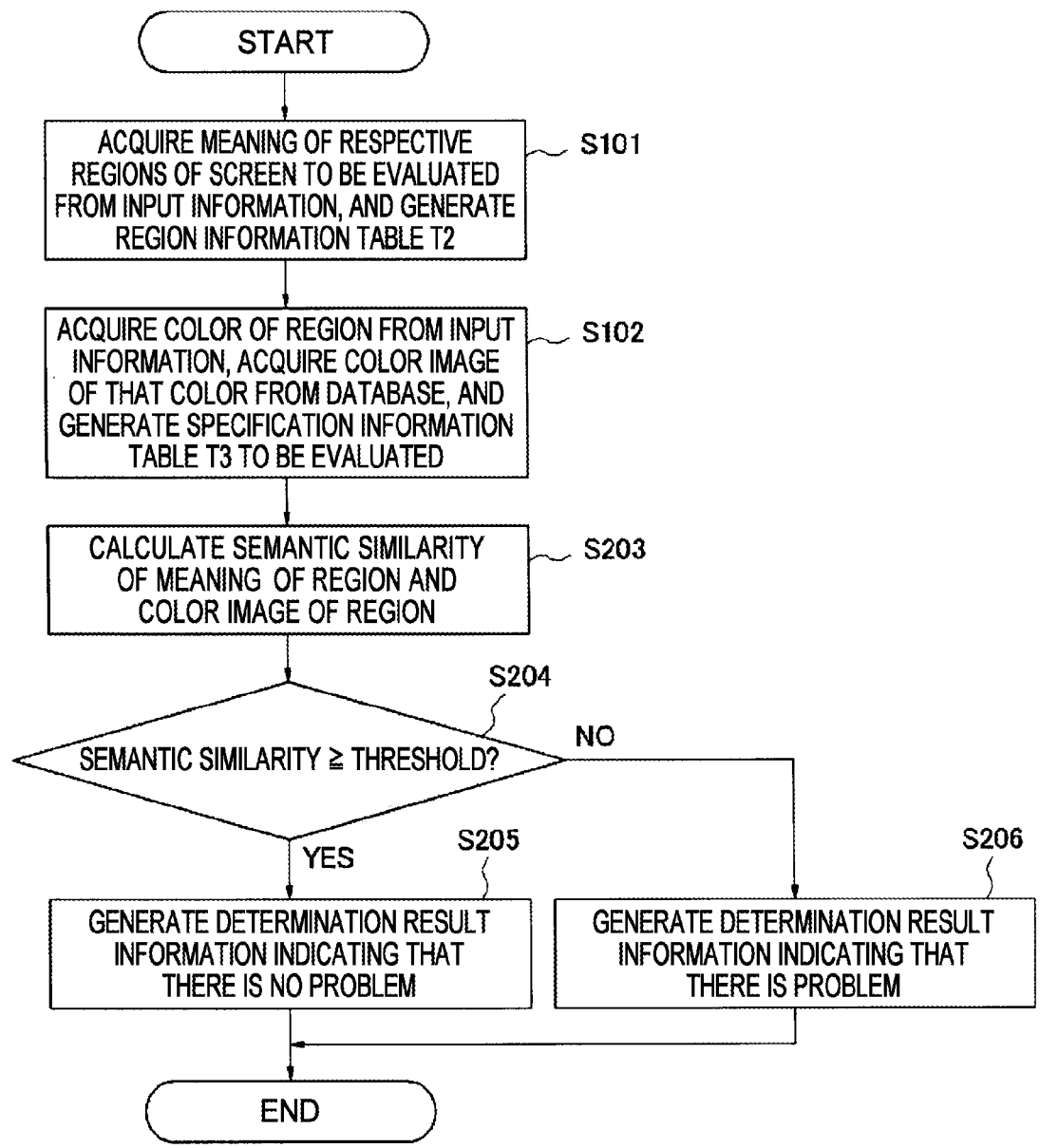
FIG. 11 is a flowchart related to the processing to be performed by the color evaluation apparatus according to the third embodiment.

The operation of the color evaluation apparatus according to the third embodiment is now explained with reference to the flowchart of FIG. 11. FIG. 11 is a flowchart related to the processing to be performed by the color evaluation apparatus according to the third embodiment. In the ensuing explanation, the characteristic portions according to this embodiment are mainly explained, and the same configuration as the foregoing first embodiment is given the same reference numeral, and the redundant explanation thereof is omitted.

The semantic similarity calculation unit 120 extracts one line from the specification information table T3. The semantic similarity calculation unit 120 calculates the similarity of the character string representing the meaning of the display information and the character string representing the color image with regard to the one line that was extracted. Subsequently, the semantic similarity calculation unit 120 associates the one line that was extracted from the specification information table T3 and the similarity calculated above, and registers a pair formed from the one line and similarity configured from the foregoing associated in the semantic similarity table T4. The semantic similarity calculation unit 120 generates this kind of pair for all lines of the specification information table T3 (step S203).

The consistency evaluation unit 121 receives the semantic similarity table T4, and determines whether the calculated similarity is greater than or equal to a predetermined threshold (step S204). When the calculated similarity is greater than or equal to a predetermined threshold, the consistency evaluation unit 121 evaluates "No problem with color scheme" (step S205), and when the calculated similarity is less than a predetermined threshold, the consistency evaluation unit 121 evaluates "Problem with color scheme" (step S206).

The color evaluation apparatus according to the third embodiment calculates the similarity of the character string representing the color image associated with the color assigned to each of the small regions of the screen to be evaluated and the character string associated with that small region, checks whether the result value is greater than or equal to a predetermined threshold, and thereby evaluates the appropriateness of the color scheme and the meaning contained in that small region.

In other words, according to the color evaluation apparatus of the third embodiment, it is possible to evaluate the appropriateness of the color scheme of the region in the image to be evaluated and the meaning included in that region.

The color evaluation apparatus according to the third embodiment calculates the similarity as a continuous value by calculating the semantic similarity of the character string representing the meaning conveyed by the display information associated with a region and the character string representing the color image of that region. Hence, according to the color evaluation apparatus of the third embodiment, it is possible to know the similarity of the color image that is sensed upon viewing the color assigned to each of the small regions on the screen to be evaluated, and the meaning of the information displayed in that small region.

In the foregoing explanation, the color evaluation apparatus according to the third embodiment was based on the first embodiment. The color evaluation apparatus according to the third embodiment may also acquire the color image database 107 from the storage unit 127 as with the second embodiment. Even in the foregoing case, the color evaluation apparatus according to the third embodiment can yield all of the effects similar to those described above.

Fourth Embodiment

The fourth embodiment, which is based on the foregoing first embodiment, is now explained. The fourth embodiment can also be based on the foregoing second embodiment. In the ensuing explanation, the differences between this embodiment and the foregoing first embodiment are mainly explained. The same configuration as the foregoing first embodiment is given the same reference numeral, and the redundant explanation thereof is omitted.

Figure 12:
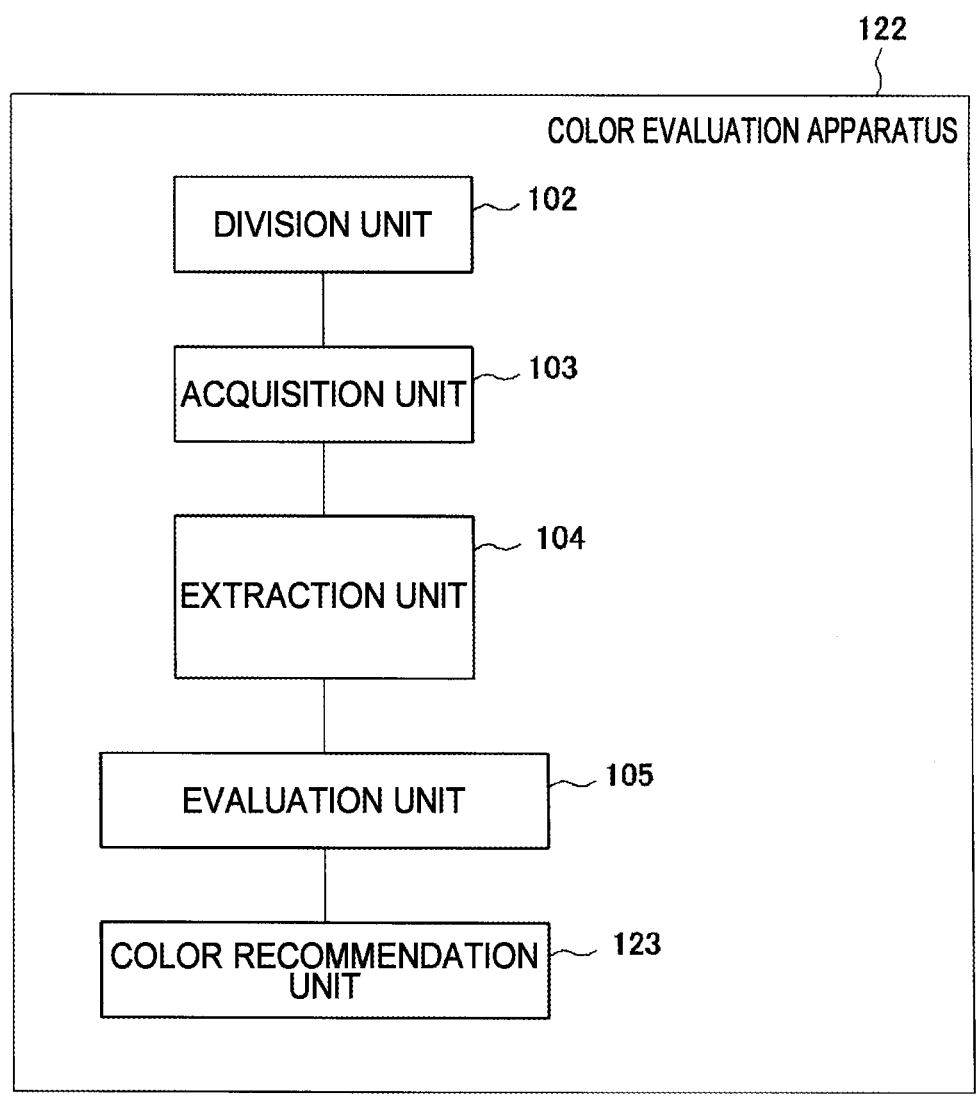
FIG. 12 is a block diagram showing a configuration of the color evaluation apparatus according to the fourth embodiment.

FIG. 12 is a block diagram showing a configuration of the color evaluation apparatus according to the fourth embodiment. Referring to FIG. 12, the difference between the fourth embodiment and the first embodiment is that the configuration of the color evaluation apparatus 122 in the fourth embodiment additionally comprises a color recommendation unit 123.

When the evaluation unit 105 evaluates "Problem with color scheme", the color recommendation unit 123 inspects whether there is a character string that coincides with the character string representing the meaning of display information of the region among all character strings representing the color image of the color image table in the color database. Subsequently, when there is a coinciding character string, the color recommendation unit 123 acquires the color information that is related thereto, and, when there is no coinciding character string, the color recommendation unit 123 generates information indicating "No recommended color". The color recommendation unit 123 thereby selects a color that is suitable for that region. In the foregoing explanation, while the color recommendation unit 123 based its recommendation on whether the character strings coincide, the color recommendation unit 123 may also perform similar processing based on similarity.

When basing the processing on similarity, for example, the color recommendation unit 123 calculates the similarity of the respective character strings in the character string group representing the color image and the character string representing the meaning of display information of the region based on methods such as LSA. The color recommendation unit 123 thereafter acquires the color information associated with the character string in which the calculated similarity is maximum. The color recommendation unit 123 thereby selects a color that is suitable for that region.

Figure 13:
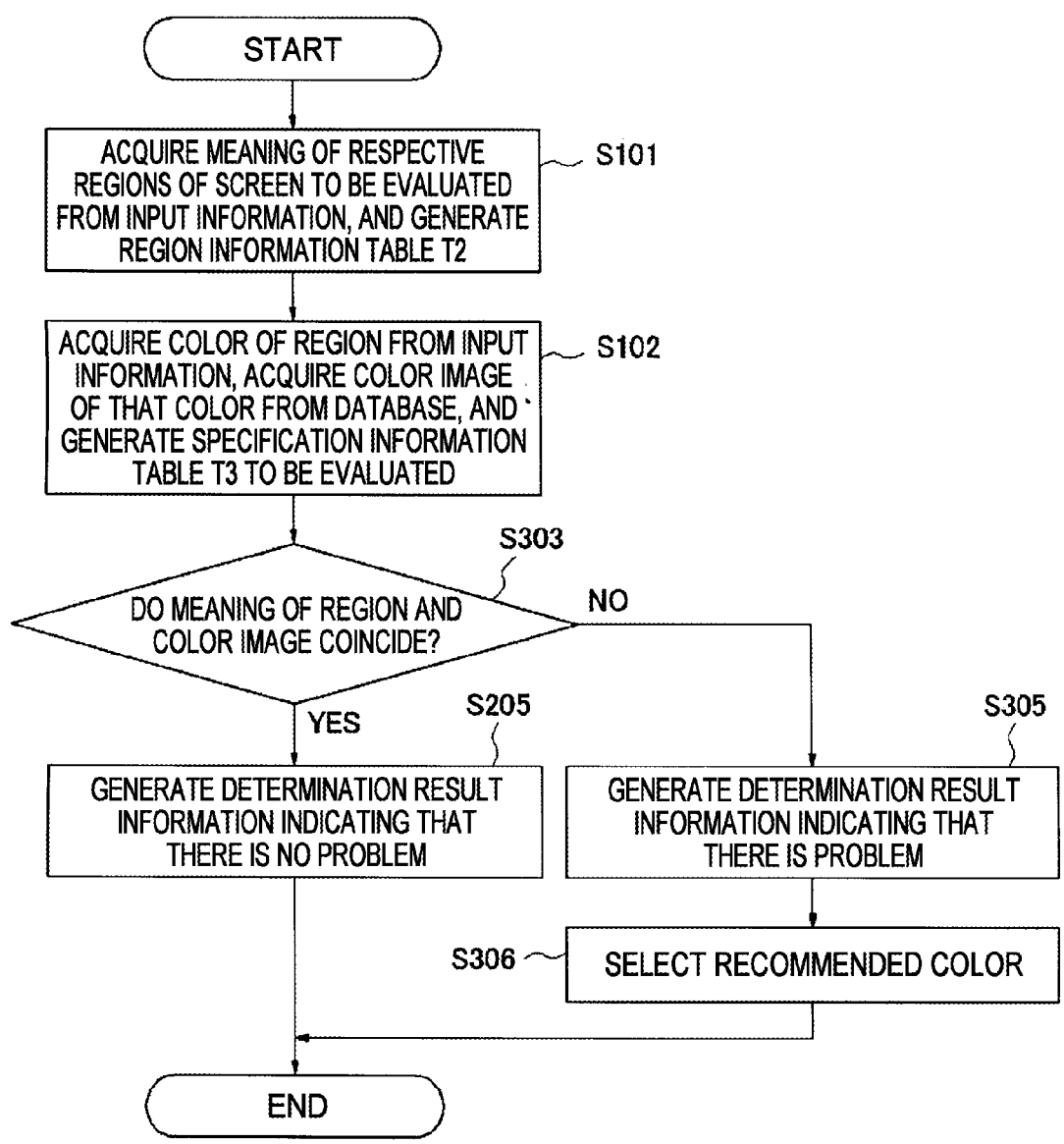
FIG. 13 is a flowchart related to the processing to be performed by the color evaluation apparatus according to the fourth embodiment.

The operation of the color evaluation apparatus according to the fourth embodiment is now explained with reference to the flowchart of FIG. 13. In the ensuing explanation, the characteristic portions according to this embodiment are mainly explained, and the same configuration as the foregoing first embodiment is given the same reference numeral, and the redundant explanation thereof is omitted. FIG. 13 is a flowchart related to the processing to be performed by the color evaluation apparatus according to the fourth embodiment.

Referring to FIG. 13, when the evaluation unit 105 generates determination result information indicating that there is a problem (determination of NO in step S303), the color recommendation unit 123 checks whether there is a character string that coincides with the character string representing the meaning of display information of the small region among all character strings representing the color image of the color image table in the color database (step S305). Subsequently, when there is a coinciding character string, the color recommendation unit 123 acquires the color information that is paired therewith, and, when there is no coinciding character string, the color recommendation unit 123 generates information indicating "No recommended color". The color recommendation unit 123 thereby selects the recommended color, which is a color that is suitable for that region (step S306). In the foregoing explanation, while the color recommendation unit 123 based its recommendation on whether the character strings coincide, the color recommendation unit 123 may also perform similar processing by using the similarity as with the color evaluation apparatus according to the third embodiment.

In other words, according to the color evaluation apparatus of the fourth embodiment, it is possible to evaluate the appropriateness of the color scheme of the region in the image to be evaluated and the meaning included in that region.

Furthermore, according to the color evaluation apparatus of the fourth embodiment, in addition to the foregoing effect, it is possible to know the consistency of the color image that is sensed upon viewing the color assigned to each of the small regions on the screen to be evaluated, and the meaning of the information displayed in that small region.

Furthermore, according to the color evaluation apparatus of the fourth embodiment, in addition to the effect of the foregoing third embodiment, when the color scheme in a region is inappropriate, a color that is suitable for the meaning represented by the character string associated with that region is presented to the user via a display device (not shown).

In the foregoing explanation, the color evaluation apparatus according to the fourth embodiment was based on the first embodiment. The color evaluation apparatus according to the fourth embodiment may also acquire the color image database 107 from the storage unit 127 as with the second embodiment. Even in the foregoing case, the color evaluation apparatus according to the fourth embodiment can yield all of the effects similar to those described above.

Fifth Embodiment

The fifth embodiment, which is based on the foregoing third embodiment, is now explained. In the ensuing explanation, the differences between this embodiment and the third embodiment are mainly explained. The same configuration as the foregoing third embodiment is given the same reference numeral, and the redundant explanation thereof is omitted.

Figure 14:
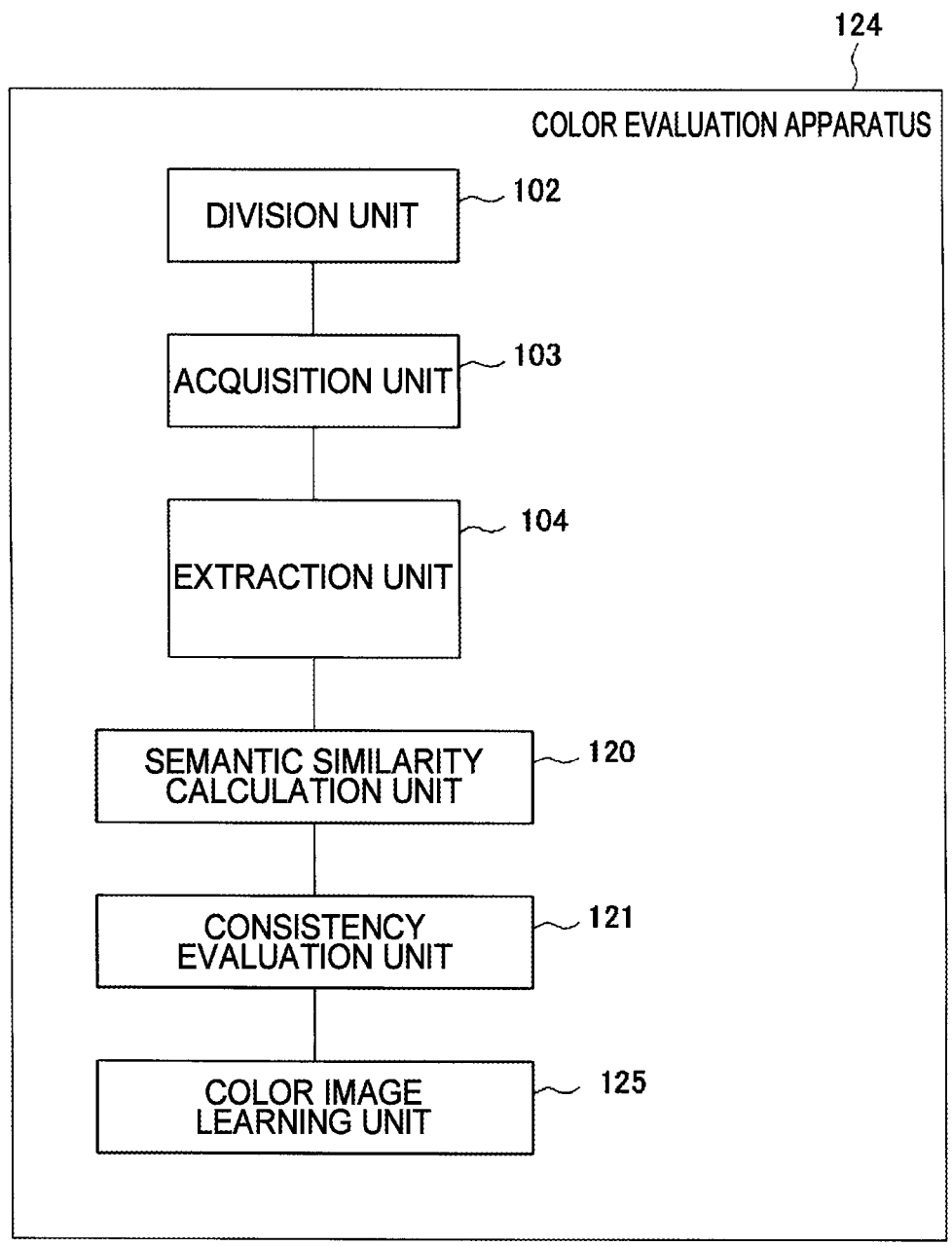
FIG. 14 is a block diagram showing a configuration of the color evaluation apparatus according to the fifth embodiment.

FIG. 14 is a block diagram showing a configuration of the color evaluation apparatus according to the fifth embodiment.

Referring to FIG. 14, the color evaluation apparatus 124 according to the fifth embodiment comprises a color image learning unit 125 in addition to the configuration of the color evaluation apparatus according to the third embodiment.

When the consistency evaluation unit 121 determines that the character string representing the meaning of the small region and the character string representing the color image of the small region coincide, the color image learning unit 125 adds that character string to the character string representing the color image that was associated with a color having the same value as the color of the small region where the character string exists in the color image table. The color evaluation apparatus according to the fifth embodiment can thereby increase the types of character strings representing the color image.

The processing flow of the color evaluation apparatus according to the fifth embodiment is now explained. In the ensuing explanation, the characteristic portions according to this embodiment are mainly explained, and the same configuration as the foregoing third embodiment is given the same reference numeral, and the redundant explanation thereof is omitted.

Figure 15:
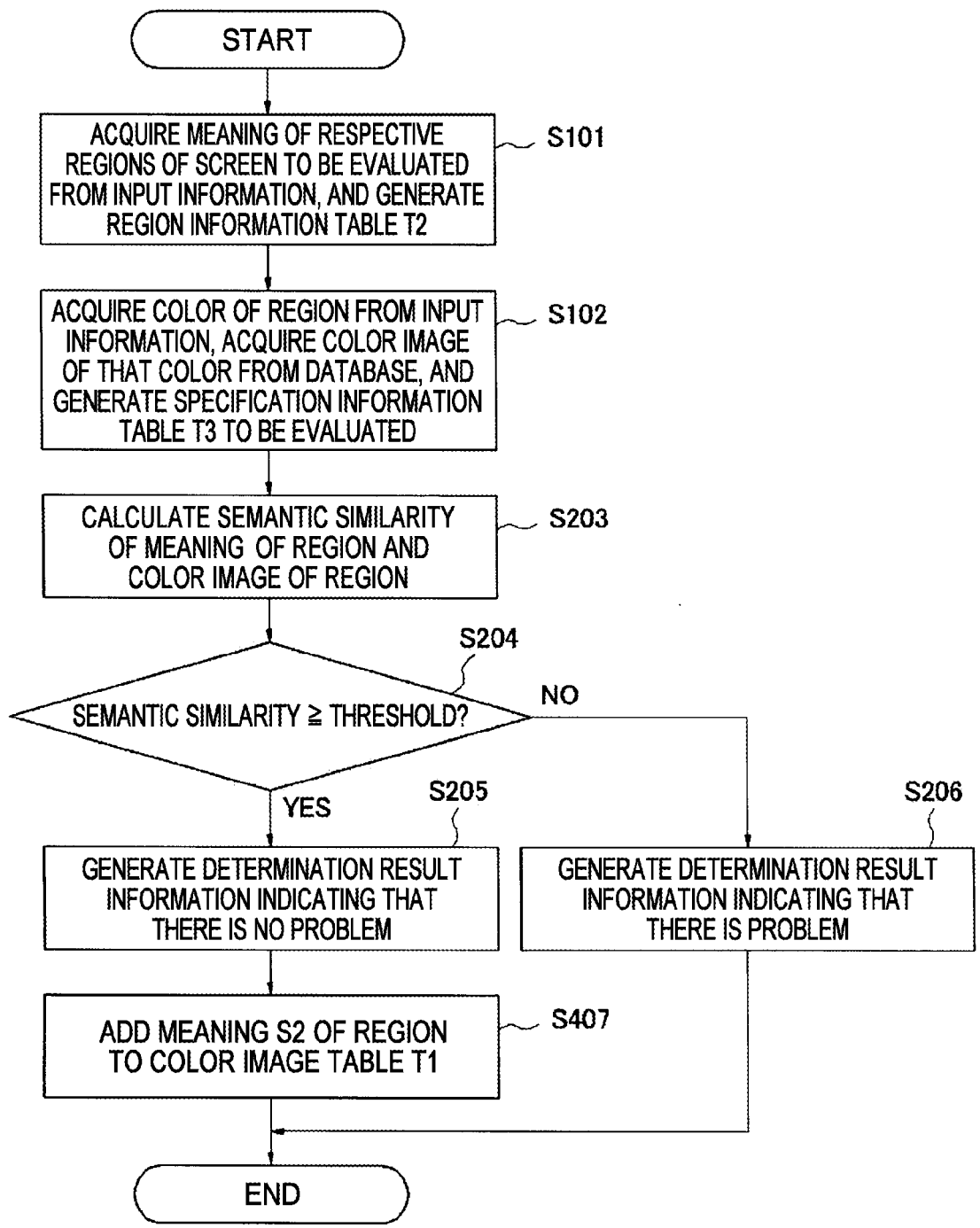
FIG. 15 is a flowchart related to the processing to be performed by the color evaluation apparatus according to the fifth embodiment.

The operation of the color evaluation apparatus according to the fifth embodiment is now explained with reference to the flowchart of FIG. 15. FIG. 15 is a flowchart related to the processing to be performed by the color evaluation apparatus according to the fifth embodiment.

When the consistency evaluation unit 121 determines that the calculated similarity is greater than or equal to a predetermined threshold, the color image learning unit 125 adds the character string representing the meaning of the small region to the character string representing the color image of a line having the same value as the color of the small region where the character string exists in the color image table (step S407).

The color evaluation apparatus according to the fifth embodiment calculates the similarity of the text representing the color image of the color assigned to each of the small regions of the screen to be evaluated and the character string representing the meaning of that small region, checks whether the result value is greater than or equal to a predetermined threshold, and thereby evaluates the appropriateness of the color scheme and the meaning contained in the that small region.

In other words, according to the color evaluation apparatus of the fifth embodiment, it is possible to evaluate the appropriateness of the color scheme of the region in the image to be evaluated and the meaning included in that region.

The color evaluation apparatus according to the fifth embodiment expresses the similarity as a continuous value by calculating the semantic similarity of the character string representing the meaning conveyed by the display information associated with a region and the character string representing the color image of that region. In other words, according to the color evaluation apparatus of the fifth embodiment, in addition to the effect of the foregoing fourth embodiment, it is possible to know the similarity of the color image that is sensed upon viewing the color assigned to each of the regions on the screen to be evaluated, and the meaning of the information displayed in that region.

In addition, the color evaluation apparatus according to the fifth embodiment determines the consistency of the character string representing the meaning conveyed by the display information associated with a region and the character string representing the color image in the color image table. When the results coincide, the color evaluation apparatus according to the fifth embodiment adds the character string representing the meaning of that region to the color image table. Thus, the color evaluation apparatus according to the fifth embodiment can retain the color image table in its latest state each time color evaluation is performed. In other words, the color evaluation apparatus according to the fifth embodiment can even more accurately evaluate the color since it can learn the color image each time a color is evaluated.

In the foregoing explanation, the color evaluation apparatus according to the fifth embodiment was based on the third embodiment. The color evaluation apparatus according to the fifth embodiment may also acquire the color image database 107 from the storage unit 127 as with the second embodiment. Even in the foregoing case, the color evaluation apparatus according to the fifth embodiment can yield all of the effects similar to those described above.

Example of Hardware Configuration

Figure 16:
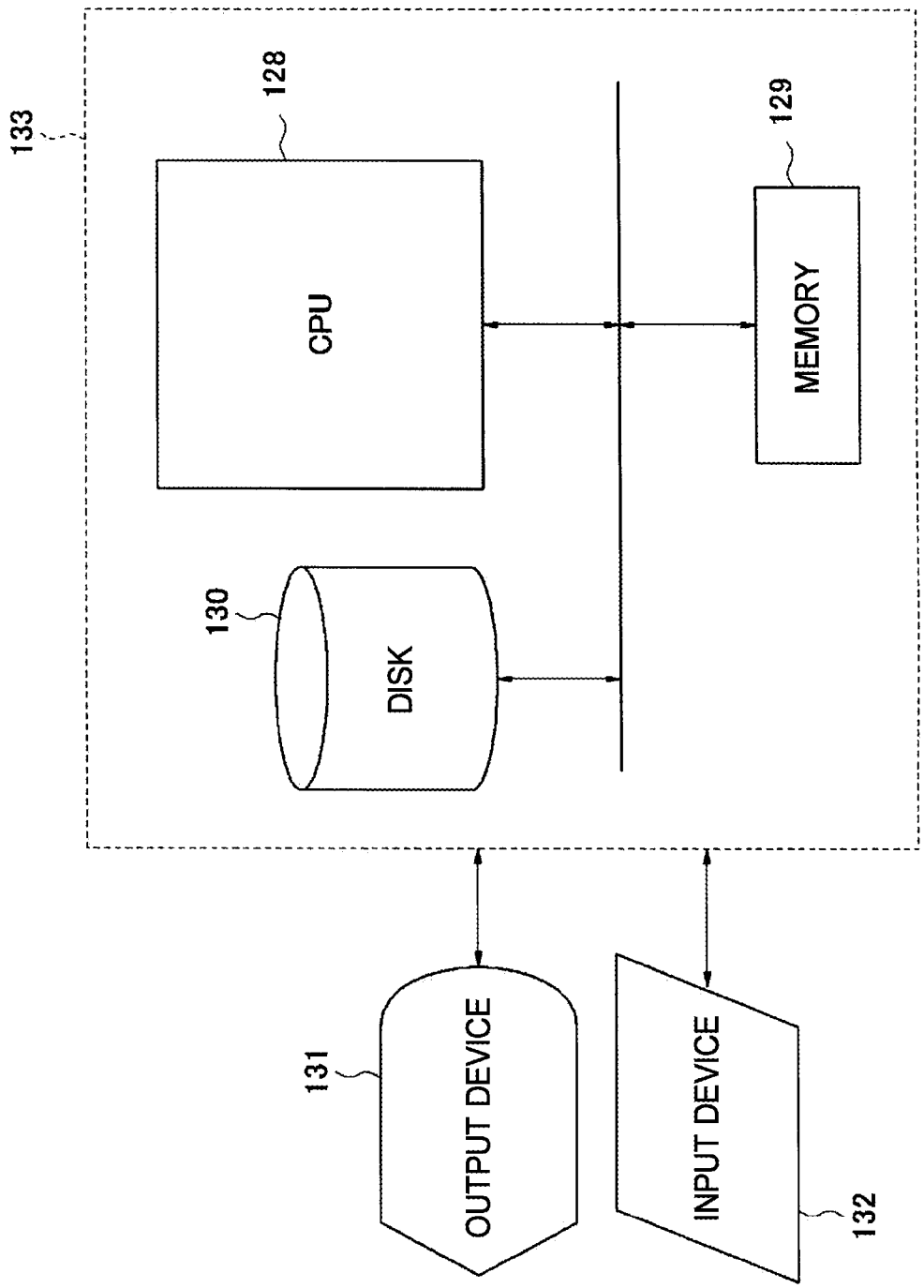
FIG. 16 is a block diagram schematically showing the hardware configuration of the calculation processing device capable of realizing the color evaluation apparatus according to the embodiments.

FIG. 16 is a block diagram schematically showing the hardware configuration of the calculation processing device capable of realizing the color evaluation apparatus according to the embodiments.

A configuration example of the hardware resources for realizing the color evaluation apparatus in each of the foregoing embodiments using one calculation processing device (information processing device, computer) is now explained. However, this color evaluation apparatus may also be realized by physically or functionally using at least two types of calculation processing devices. Moreover, this color evaluation apparatus may also be realized as a dedicated apparatus.

FIG. 16 is a block diagram schematically showing the hardware configuration of the calculation processing device capable of realizing the color evaluation apparatus according to the first to fifth embodiments. The calculation processing device 133 includes a CPU (Central Processing Unit) 128, a memory 129, a disk 130, an output device 131, and an input device 132.

In other words, the CPU 128 copies a software program (computer program; hereinafter simply referred to as a program) stored in the disk 130 to the memory 129 upon executing the program, and then executes arithmetic processing. The CPU 128 reads data which is required for executing the program from the memory 129. When results need to be displayed, the CPU 128 displays the output result on the output device 131. When inputting a program from the outside, the CPU 128 reads the program from the input device 132. The CPU 128 interprets and executes the color evaluation program stored in the memory 129. The CPU 128 sequentially performs the processing according to the flowcharts (FIG. 5, FIG. 8, FIG. 11, FIG. 13, FIG. 15) referred to in each of the foregoing embodiments.

While the present invention was described according to the foregoing embodiments, these embodiments are provided for facilitating the understanding of the present invention, and should not be used for limiting the interpretation of the present invention. The present invention may be changed and improved without deviating from the gist thereof, and equivalents of the present invention are also covered herein.

Note that a part or all of the respective embodiments described above may also be described as per the following Notes, but the present invention is not limited thereto.

Further Exemplary Embodiment 1

A color evaluation apparatus, comprising a partial image identification unit that identifies a partial region of an input image, an information acquisition unit that acquires color information for identifying a color contained in the partial region and a first character string contained in the partial region, a first extraction unit that extracts a second character string which is associated in advance with the color information, and an evaluation unit that evaluates appropriateness of the color information according to a result of comparing the first character string and the second character string.

Further Exemplary Embodiment 2

The color evaluation apparatus according to Supplement 1, further comprising a first storage unit that stores the second character string which is associated in advance with each of color information pieces, wherein the first extraction unit extracts, from the first storage unit, the second character string which is associated with the color information acquired by the information acquisition unit.

Further Exemplary Embodiment 3

The color evaluation apparatus according to Supplement 2, wherein the evaluation unit evaluates the appropriateness of the color information according to whether a similarity between the first character string and the second character string is greater than or equal to a threshold.

Further Exemplary Embodiment 4

The color evaluation apparatus according to Supplements 2 or 3, further comprising a color recommendation unit that searches for the first character string from a list of second character strings stored in the first storage unit when the evaluation unit evaluates the color information pertaining to the partial region to be inappropriate, and outputs the color information associated in advance with the searched second character string as the appropriate color information corresponding to the partial region.

Further Exemplary Embodiment 5

The color evaluation apparatus according to Supplement 3, further comprising a color recommendation unit that calculates, when the evaluation unit evaluates the color information pertaining to the partial region to be inappropriate, a similarity between the first character string and the second character string which is associated in advance with the color information other than the inappropriate color information stored in the first storage unit, and outputs the color information associated in advance with the second character string as the appropriate color information corresponding to the partial region according to whether the similarity is greater than or equal to a threshold.

Further Exemplary Embodiment 6

The color evaluation apparatus according to any one of Supplements 3 to 5, wherein, when the evaluation unit evaluates the color information pertaining to the partial region to be appropriate, the first character string which is associated with the partial region is added to a list of the second character strings which are associated with the color information pertaining to the partial region stored in the first storage unit.

Further Exemplary Embodiment 7

The color evaluation apparatus according to any one of Supplements 2 to 6, comprising, in substitute for the first storage unit, a second storage unit that stores a table indicating an association between the color information and the second character string by associating the table with an evaluation criterion regional name, and comprising, in substitute for the first extraction unit, a second extraction unit that searches for the table which is associated with a predetermined evaluation criterion regional name from the second storage unit, and extracts the second character string which is associated with the partial region in the table.

Further Exemplary Embodiment 8

The color evaluation apparatus according to any one of Supplements 1 to 7, wherein the partial image identification unit identifies the partial region based on an analysis of a tag scope or image processing, or based on both an analysis of a tag scope and image processing, wherein the first character string is a character string that represents a meaning of the partial region which is associated with the first character string, and wherein the second character string is a word that is associated from a color represented by the color information which is associated with the second character string.

Further Exemplary Embodiment 9

A color evaluation method, comprising: identifying a partial region of an input image, acquiring color information for identifying a color contained in the partial region and a first character string contained in the partial region, extracting a second character string which is associated in advance with the color information, and evaluating appropriateness of the color information according to a result of comparing the first character string and the second character string.

Further Exemplary Embodiment 10

A computer program that causes a computer to implement an identification function of identifying a partial region of an input image, an acquisition function of acquiring color information for identifying a color contained in the partial region and a first character string contained in the partial region, an extraction function of extracting a second character string which is associated in advance with the color information, and an evaluation function of evaluating appropriateness of the color information according to a result of comparing the first character string and the second character string.

This application relates to and claims priority from Japanese Patent Application No. 2012-077563, filed on Mar. 29, 2012, the entire disclosure of which is incorporated herein by reference.

I1 Evaluation target screen information
I2 Evaluation criterion regional name
I3 Color information
I4 Region information
T1 Color image table
T2 Region information table
T3 Specification information table
T4 Semantic similarity table
S1 Color image character string
S2 Meaning of display information of region
101 Color evaluation apparatus
102 Division unit
103 Acquisition unit
104 Extraction unit
105 Evaluation unit
106 Extraction unit
107 Color image database
108 Color image table
109 Color image table
110 Title region
111 Navigation region
112 Heading region
113 Input region
114 Label region of input region
115 Auxiliary information region
116 Auxiliary information region
117 Button region
118 Background
119 Color evaluation apparatus
120 Semantic similarity calculation unit
121 Consistency evaluation unit 122 Color evaluation apparatus
123 Color recommendation unit
124 Color evaluation apparatus
125 Color image learning unit
126 Color evaluation apparatus
127 Storage unit
128 CPU
129 Memory
130 Disk
131 Output device
132 Input device
133 Calculation processing device

I claim:

1. A color evaluation apparatus, comprising:
a first storage device configured to store a second character string which is associated in advance with each of color information pieces;
a partial image identification device configured to identify a partial region of an input image;
an information acquisition device configured to acquire color information for identifying a color contained in the partial region and a first character string contained in the partial region;
a first extraction device configured to extract, from the first storage device, the second character string which is associated in advance with the color information acquired by the information acquisition device; and
an evaluation device configured to evaluate appropriateness of the color information according to whether a similarity between the first character string and the second character string is greater than or equal to a threshold.

2. The color evaluation apparatus according to claim 1, further comprising:
a color recommendation device configured to search for the first character string from a list of second character strings stored in the first storage device when the evaluation device evaluates the color information pertaining to the partial region to be inappropriate, and outputs the color information associated in advance with the searched second character string as the appropriate color information corresponding to the partial region.

3. The color evaluation apparatus according to claim 1, further comprising:
a color recommendation device configured to calculate, when the evaluation device evaluates the color information pertaining to the partial region to be inappropriate, a similarity between the first character string and the second character string which is associated in advance with the color information other than the inappropriate color information stored in the first storage device, and outputs the color information associated in advance with the second character string as the appropriate color information corresponding to the partial region according to whether the similarity is greater than or equal to a threshold.

4. The color evaluation apparatus according to claim 1,
wherein, when the evaluation device evaluates the color information pertaining to the partial region to be appropriate, the first character string which is associated with the partial region is added to a list of the second character strings which are associated with the color information pertaining to the partial region stored in the first storage device.

5. The color evaluation apparatus according to claim 1,
comprising, in substitute for the first storage device, a second storage device configured to store a table indicating an association between the color information and the second character string by associating the table with an evaluation criterion regional name, and
comprising, in substitute for the first extraction device, a second extraction device configured to search for the table which is associated with a predetermined evaluation criterion regional name from the second storage device, and extracts the second character string which is associated with the partial region in the table.

6. The color evaluation apparatus according to claim 1,
wherein the partial image identification device identifies the partial region based on an analysis of a tag scope or image processing, or based on both an analysis of a tag scope and image processing,
wherein the first character string is a character string that represents a meaning of the partial region which is associated with the first character string, and
wherein the second character string is a word that is associated from a color represented by the color information which is associated with the second character string.

7. A color evaluation method, comprising:
storing a second character string which is associated in advance with each of color information pieces;
identifying a partial region of an input image;
acquiring color information for identifying a color contained in the partial region and a first character string contained in the partial region;
extracting the second character string which is associated in advance with the color information; and
evaluating appropriateness of the color information according to whether a similarity between the first character string and the second character string is greater than or equal to a threshold.

8. A non-transitory storage device storing a computer program that causes a computer to implement:
a storing function of storing a second character which is associated in advance with each of color information pieces;
an identification function of identifying a partial region of an input image;
an acquisition function of acquiring color information for identifying a color contained in the partial region and a first character string contained in the partial region;
an extraction function of extracting a second character string which is associated in advance with the color information; and
an evaluation function of evaluating appropriateness of the color information according to whether a similarity between the first character string and the second character string is greater than or equal to a threshold.

* * * * *